US008095176B2

United States Patent
Sudak

(10) Patent No.: US 8,095,176 B2
(45) Date of Patent: Jan. 10, 2012

(54) METHOD AND APPARATUS OF SUBCHANNELIZATION OF WIRELESS COMMUNICATION SYSTEM

(75) Inventor: Eran Sudak, Herzliyn (IL)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 12/327,838

(22) Filed: Dec. 4, 2008

(65) Prior Publication Data

US 2010/0144340 A1    Jun. 10, 2010

(51) Int. Cl.
*H04M 1/00* (2006.01)
(52) U.S. Cl. ............... 455/552.1; 455/41.2
(58) Field of Classification Search ............... 455/552.1, 455/41.2
See application file for complete search history.

(56) References Cited

U.S. PATENT DOCUMENTS

| 2008/0238807 A1* | 10/2008 | Ibrahim et al. | 343/876 |
| 2008/0247445 A1* | 10/2008 | Guo et al. | 375/220 |
| 2009/0003307 A1* | 1/2009 | Yang et al. | 370/350 |

OTHER PUBLICATIONS

Bluetooth Special Interest Group, Telephony Working Group "Bluetooth/WiMAX Coexistence—Solution and Recommendations", May 12, 2008.

* cited by examiner

*Primary Examiner* — Quan Tra
(74) *Attorney, Agent, or Firm* — Cool Patent, P.C.; Joseph P. Curtin

(57) ABSTRACT

A Bluetooth radio which include a coexistence module. The coexistence module is able to associate the Bluetooth radio with one of a first radio and a second radio by monitoring a desired signal pattern for at least a predetermined time and associating with one of the first radio and the second radio based on a detection of the desired signal pattern.

12 Claims, 2 Drawing Sheets

METHOD AND APPARATUS OF SUBCHANNELIZATION OF WIRELESS COMMUNICATION SYSTEM

BACKGROUND OF THE INVENTION

There are plurality of different type of wireless communication systems in the market which may be used to connect people and for transfer data, voice and video over the air. Those wireless communication systems may include such as. for example, wireless metropolitan area network (WMAN) that also may be referred as WiMAX, wireless local area network (WLAN) that also may be referred to as WiFi, Bluetooth system and/or cellular systems e.g., Long Term Evolution (LTE) and the like.

When considering mobile Multi-radio Platforms containing WiFi, WiMAX and Bluetooth (BT) radios, there are several use cases which require the simultaneous operation of WiFi or WiMAX radio along with BT radio. Due to channel adjacency, simultaneous operation of WiFi and BT or WiMAX and BT might result in collisions on the wireless medium, causing interference and packet loss. One of the common approaches to mitigate such issues is by using a Medium Access Control (MAC) coordination interface, often referred to as "coexistence interface" that attempts to coordinate the operation of the two radios in a manner that minimizes collisions by partitioning the air medium usage between radios. The existing coexistence interfaces, and those under development, are all designed as point-to-point interfaces, planned to coordinate between two distinct radio technologies. They differ by the semantics of the signals in the interface, and sometimes by the behavior of the MAC and higher layer. For example, BT radio may behave differently when working with WiMAX radio than with WiFi radio, e.g., using different parameters for voice calls depending on the technology with which it operates. In order to provide BT connectivity both to the WiFi radio and the WiMAX a large number of hardware connections (e.g., pins) is required which may increase the cost and both hardware and software complexity of the Multi-radio Platform.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
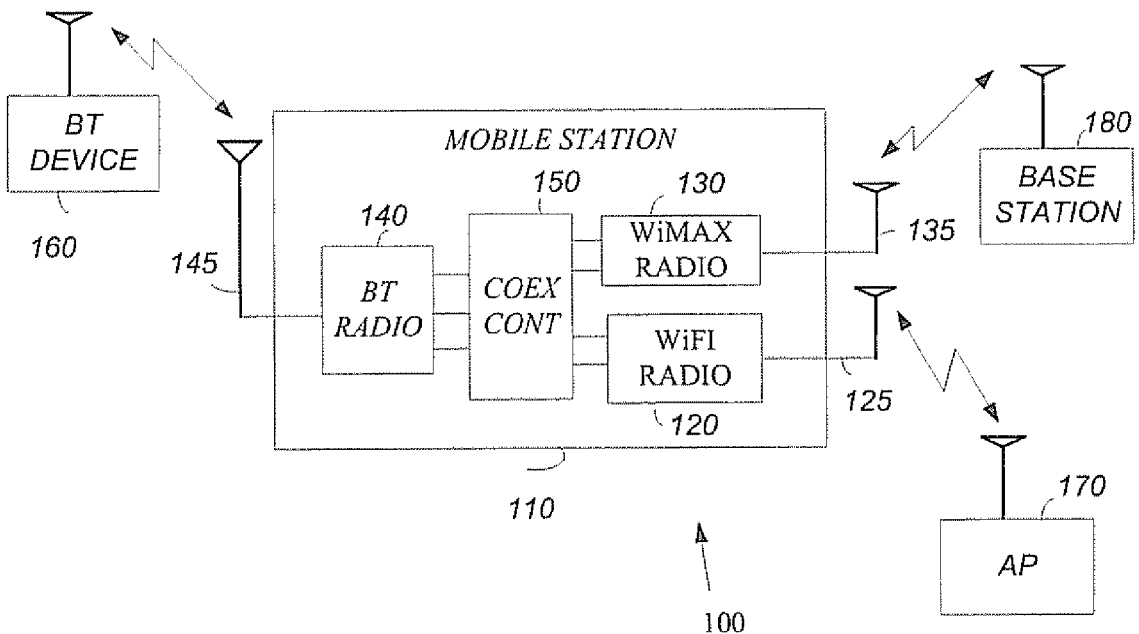
FIG. 1 is an illustration of a portion of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. It will be, however, understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN) which also may be referred as WiFi, wireless metropolitan area network (WMAN) which also may be referred as WiMAX, a wireless personal area network (WPAN) such as, for example Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals.

Turning first to FIG. 1, an illustration of a portion of a wireless communication system according to an exemplary embodiment of the present invention is shown. According to this exemplary embodiment of the invention, a wireless communication system 100 includes a mobile station (MS) 110, a Bluetooth device 160, an access point 170 and a base station 180. According to one example, MS 110 may include a coexistence controller 150, a radio 120 for example a WiFi radio, a radio 130 for example, a WiMAX radio and a radio 140 for example a Bluetooth (BT) radio. Radio 120 may be connected to antenna 125, radio 130 may be connected to antenna 135 and radio 140 may be connected to antenna 145. According to some other embodiments of the invention radios 120 and 130 may share the same antenna, if desired.

Although the scope of the present invention is not limited in this respect, antennas 125, 135 and/or 145 may include a dipole antenna, an omni-directional antenna, an internal antenna, a Yagi antenna, or the like.

According to exemplary embodiments of the invention, BT device 140 for example, may be included in a laptop computer, may transmit and/or receive voice and/or video and/or text and/or data to MS 110. MS 110 may transmit and/or receive voice and/or video and/or text and/or data from the BT device 140 to one of base station 180 and/or access point 170 via at least one of WiMAX radio 130 and/or WiFi Radio 120, respectively. According to exemplary embodiment of the invention, coexistence controller 150 may connect BT radio 140 to WiMAX radio 130 and WiFi radio 120. Coexistence controller 150 may monitor WiMAX radio 130 and WiFi radio 140 for activity and may connect the active lines to BT radio 140, if desired. Furthermore, coexistence controller 150 may synchronized between the active radio and the BT radio 140, if desired. BT radio 140 may also monitor activity of WiMAX radio 130 and WiFi radio 120 and may employ a desired BT protocol with the active radio, although it should be understood that the present invention is not limited to this example.

Figure 2:
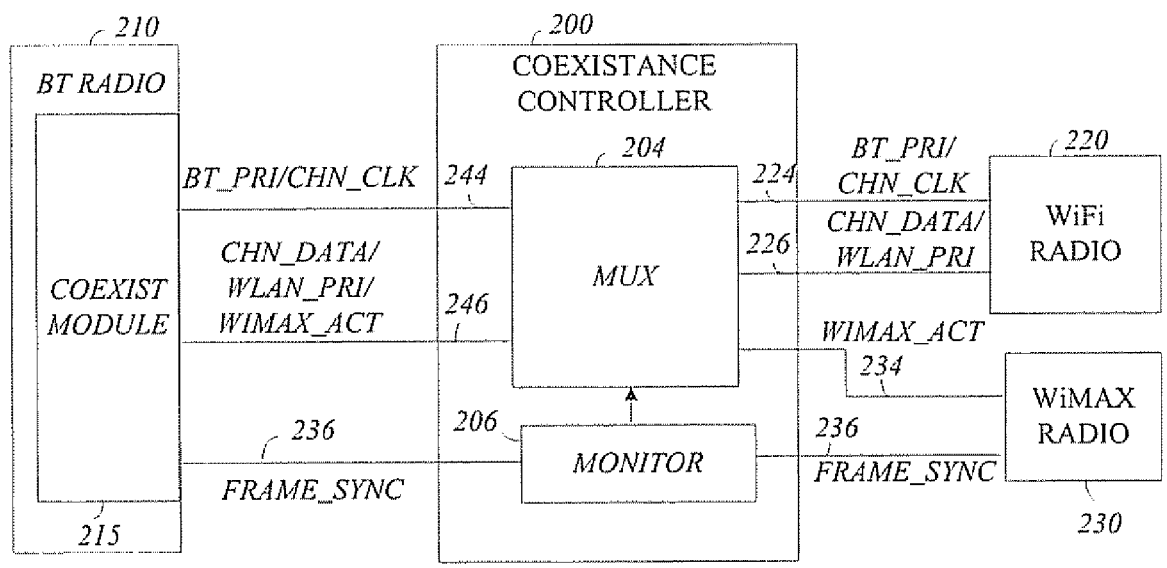
FIG. 2 is a block diagram illustrating a connection scheme between two or more radios to a Bluetooth radio apparatus according to some exemplary embodiments of the inventions.

Turning to FIG. 2 a block diagram illustrating a connection scheme to connect two or more radios to a Bluetooth radio, according to some exemplary embodiments of the invention. According to this example, a coexistence controller 200 is designed to connect a WiFi radio 220 to a Bluetooth (BT) radio 210 and a WiMAX radio 230 and to Bluetooth (BT) radio 210. It should be understood that embodiments of the invention are not limited to the WiFi radio and/or to the WiMAX radio. Connection of other radio with the BT radio may be done by using the present invention. Furthermore, coexistence controller 200 may be implemented by hardware, by software and/or any combination of hardware and software.

According to this example, BT radio 210 may include a coexistence module 215. Coexistence module 215 may monitor activity on wire 236 (e.g., FRAME_SYNC) from both BT radio 230 and WiMAX radio 230 and may synchronize BT radio 230 with WiMAX radio 230 and may switch association schemes based on the activity. For example, an activity on wire 236 may indicate WiMAX radio 230 operation. Thus, BT radio 210 may use BT-WiMAX association scheme to associate with WiMAX radio 230. In contrast, inactivity on wire 236 may cause BT radio 210 to switch to BT_WiFi association scheme in order to associate with WiFi radio 220, although it should be understood that the scope of the present invention is not limited in this respect. Furthermore, coexistence module 215 may be implemented by hardware, by software and/or any combination of hardware and software.

According to this example embodiment of the invention, the usage of wires 224 and 226 may be divert according an active association scheme. WiFi radio 220 may use a plurality of association schemes to associate with BT radio 210. For example, WiFi radio 220 may use two wires e.g., wires 224 and 226, to provide different association schemes to BT radio 210. According to one embodiment of the invention, a WiFi-BT association scheme may signal via wire 224 (e.g., BT_PRI) to WiFi radio 224 on BT radio 224 priority and wire 226 (e.g., WLAN_PRI) may signal to BT radio 210 on WiFi radio 220 activity, if desired. In another embodiment of the invention another WiFi-BT association scheme may be used. According to this association scheme, wire 224 (e.g., BT_PRI/CHN_CLK) may be used to by BT radio 210 to signal to WiFi radio 220 on the BT radio priority and to monitor a channel clock (CHN_CLK) interface during the BT_PRI. Wire 226 (e.g. CHN_DATA) may be used by WiFi radio 220 to transfer data to BT radio 210, although the scope of the present invention is not limited in this respect.

WiMAX radio 230 may use wires 234 and 236 to associate with BT radio 210. It should be understood that there are plurality of WiMAX-BT associate algorithm in the market place which may be implemented with embodiments of the invention. For example, wire 236 (e.g., FRAME_SYNC) may indicate on the activity of WiMAX radio and may be used to convey WiMAX frame timing information to BT radio 210. BT radio 210 may align its slot in a manner that may maximize the probability of successful packet exchange between BT Master and Slave devices. Wire 234 (e.g., WIMAX_ACT) may signal WiMAX radio 230 receiving activity to BT radio 210 requesting BT radio 210 to avoid from transmission.

The four wires (e.g., wires 224, 226, 234 and 236) may be operably coupled coexistence controller 200 to WiFi radio 220 and WiMAX radio 230. Coexistent controller 200 may multiplex the four wires and output three wires which operably coupled to BT radio 210. According to one example embodiment of the invention, coexistent controller 200 may include a monitor 206 to monitor activity on wire 236 (e.g., FRAME_SYNC) and a multiplexer 204 to provide the desired signals to/from BT radio 210 according to the activity of wire 236, if desired. Coexistent controller 200 may provide the signals of wires 24 (e.g., BT_PRI/CHN_CLK) and 236 (e.g., FRAME_SYNC) directly to coexistence module 215 and may provide the signals CHN_DATA and/or WLAN_PRI and/or MIMAX_ACT over wire 246 to coexistence controller 200. Although it should be understood that coexistence controller 200 and coexistence module 215 may be synchronized in order to monitor the FRAME_SYNC line simultaneously. Furthermore, coexistence controller 200 and coexistence module 215 may simultaneously switch modes, if desired. According to other example embodiment, coexistence controller 200 may inform coexistence module 215 which mode is active by sending a dedicated signal from coexistence controller 200 to coexistence module 215.

Figure 3:
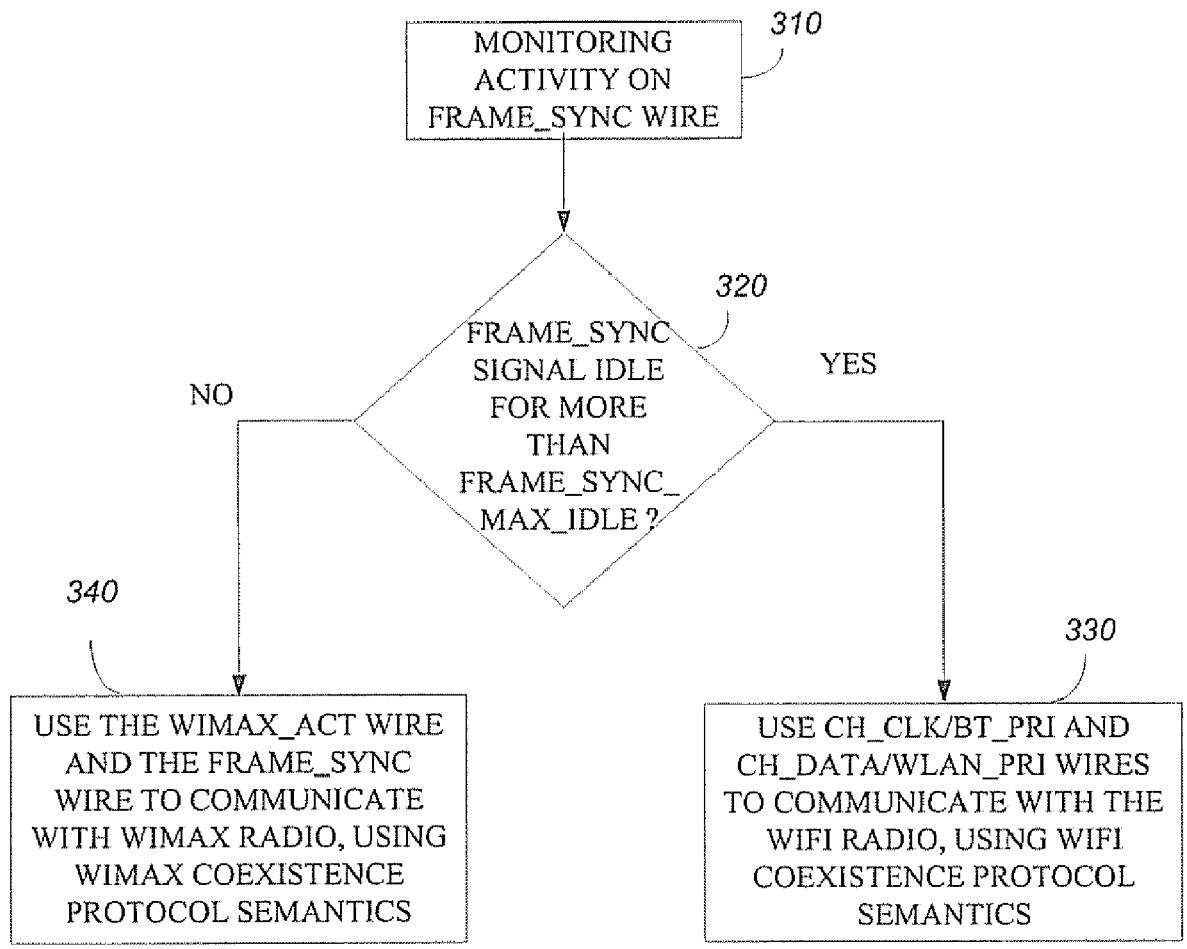
FIG. 3 is a flow chart diagram of a method of operation of a Bluetooth radio with two or more radios according to some embodiments of the invention.

Turning to FIG. 3, a flow chart diagram of a method of operation of a Bluetooth radio with two or more radios according to some embodiments of the invention is shown. The method is based on the assumption that the WiFi radio and the WiMAX radio may not be associated simultaneously (but association state may switch dynamically between the two). According to this method, when there is no activity of FRAME-SYNC signal a BT radio is associated with a WiFi radio, although the scope of the present invention is not limited to this example.

According to some embodiments of the invention coexistence module 215 of BT radio 210 may detect which radio is associated at a given time, and may switch its operation mode accordingly, including interpretation of interface semantics, if desired. This may be achieved by synchronizing coexistence module 215 with coexistence controller 200 and monitoring simultaneously a signal activity on the FRAME-_SYNC wire (text block 310).

Upon detection of a desired activity pattern, for example rising edge of the FRAME_SYNC signal for at least once every FRAME_SYNC_MAX_IDLE (diamond 320). The FRAME_SYNC_MAX_IDLE lime may be set to 5 milliseconds (ms), 10 ms, 15 ms or the like. The BT module 215 may deduce that a WiMAX radio is associated and may switch the BT radio to WiMAX coexistence mode. BT module 215 may use the WIMAX_ACT wire (e.g., wire 246) and the FRAME-_SYNC wire (e.g., wire 236) to communicate with the WiMAX radio, using BT-WiMAX association schemes (text block 340), if desired.

Detection of other pattern for example, long inactivity of the FRAME_SYNC signal for at more then FRAME_SYN-C_MAX_IDLE time (diamond 320), may imply that the WiMAX radio may unassociated, and BT module 215 may revert back to a WiFi mode, if desired. In the WiFi mode BT module 215 may use CH_CLK/BT_PRI wire (e.g., wire 244) and CH_DATA/WLAN_PRI wire (e.g., wire 226), to communicate with the WiFi radio using at least one of the WiFi-BT coexistence schemes, if desired (text block 330). The WiFi radio may monitor and interpret the activity on the CHI_CLK/BT_PRI signal when it is associated. In contrast, the WiMAX radio may not necessarily monitor this signal.

According to another embodiment of the present invention, the coexistence controller (e.g., coexistence controller 200) may include a software stack to pass out-of-band message to the BT module SW stack, e.g., Through a host, although the scope of the present invention is not limited in this respect.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing, the claims.

What is claimed is:

1. An apparatus, comprising:
a coexistence controller operably coupled to a first radio, a second radio and to a Bluetooth radio, the Bluetooth radio operatively coupled to a coexistence module, the coexistence controller and the coexistence module of the Bluetooth radio simultaneously monitoring a desired signal pattern for at least a predetermined time to associate the Bluetooth radio with the first radio or the second radio, or a combination thereof, based on detection of the desired signal pattern.

2. The apparatus of claim 1, wherein the coexistence module is operably coupled to a three wires association scheme, and monitor the desired signal pattern on a first wire while the second and a third wires are used to associate the Bluetooth radio with the first radio and the first and the second wires are used to associate with the second radio.

3. The apparatus of claim 2, wherein the first radio comprises a WiFi radio and uses a WiFi-Bluetooth association scheme to associate with the Bluetooth radio over the second and the third wires.

4. The apparatus of claim 2, wherein the second radio comprises a WiMAX radio and uses a WiMAX-Bluetooth association scheme to associate with the Bluetooth radio over the first and the second wires.

5. An method, comprising:
synchronizing a coexistence module of a first radio with a coexistence controller;
monitoring by both the coexistence module and the coexistence controller a desired signal pattern for at least a predetermined time; and
associating the first radio with a second radio or a third radio, or a combination thereof, based on detection of the desired signal pattern.

6. The method of claim 5, wherein monitoring the desired signal pattern comprises monitoring the desired signal on a first wire; and
associating the first radio with the second radio and the third radio using second and third wires.

7. The method of claim 6, wherein associating comprises using an association scheme to associate with the second or third radio.

8. A wireless communication system, comprising:
a mobile device comprising a Bluetooth radio and a coexistence module operably coupled to a first radio and a second radio, the coexistence module of the Bluetooth radio and a coexistence controller operatively coupled to the Bluetooth radio, the first radio and the second radio and simultaneously monitoring a desired signal pattern for at least a predetermined time to associate the Bluetooth radio with one of the first radio or the second radio, or a combination thereof, based on detection of the desired signal pattern.

9. The wireless communication system of claim 8, wherein the coexistence module is operably coupled to a three wires association scheme, and monitors the desired signal pattern on a first wire while the second and a third wires are used to associate the Bluetooth radio with the first radio, and the first and the second wires are used to associate the Bluetooth radio with the second radio.

10. The wireless communication system of claim 9, wherein the first radio comprises a WiFi radio the second radio comprises a WiMAX radio.

11. The wireless communication system of claim 10, wherein the first radio uses a WiFi-Bluetooth association scheme to associate with the Bluetooth radio over the second and the third wires.

12. The wireless communication system of claim 9, wherein the second radio uses a WiMAX-Bluetooth association scheme to associate with the Bluetooth radio over the first and the second wires.

* * * * *